United States Patent

Bakel et al.

[15] 3,665,170
[45] May 23, 1972

[54] NUMERICAL CONTROL SYSTEM FOR PROVIDING A CONSTANT RATE OF METAL REMOVAL

[72] Inventors: Joseph F. Bakel, Lyndhurst; George L. Rogers, Waynesboro, both of Va.

[73] Assignee: General Electric Company

[22] Filed: Dec. 12, 1969

[21] Appl. No.: 884,417

[52] U.S. Cl..................235/151.11, 90/13 C, 90/DIG. 27, 318/39, 318/569
[51] Int. Cl.......................G05b 19/18, B23q 5/22
[58] Field of Search..............318/39, 569, 570, 572, 600, 318/601, 603, 608; 90/13 C, DIG. 27; 235/151.11

[56] References Cited

UNITED STATES PATENTS

| | | | |
|---|---|---|---|
| 2,600,988 | 6/1952 | Greene et al. | 318/39 |
| 2,809,333 | 10/1957 | Wagner | 318/39 X |
| 3,090,266 | 5/1963 | Wagner | 318/39 |
| 3,109,974 | 11/1963 | Hallmark | 318/571 X |
| 3,389,313 | 6/1968 | Reynolds | 318/39 |
| 3,418,549 | 12/1968 | Emerson et al. | 318/39 |
| 3,548,172 | 12/1970 | Centner et al. | 235/151.11 |

Primary Examiner—Joseph F. Ruggiero
Attorney—William S. Wolfe, Frank L. Neuhauser, Oscar B. Waddell and Joseph B. Forman

[57] ABSTRACT

A numerical control system for providing a constant rate of metal removal in terms of surface feet per unit time. The operative relationship between the rotational speed of a rotating workpiece (RPM), the effective radius in inches of the rotating workpiece (R) and the desired rate of metal removal in surface feet per minute (SFM) is defined as:

$$\int^T RPM \times R = \int^T SFM \times \int^T 1.9095$$

The relationship is mechanized by a plurality of digital integrators which generate pulse frequency signals proportional to each side of this relationship. These pulse frequencies are then compared with the result of this comparison affecting the speed of the rotating workpiece so as to close the control loop and fully mechanize this relationship. In one embodiment, the pulse frequencies are compared by generating phase varying signals which are then phase compared. In another, a single phase varying signal is generated and phase compared with a constant phase signal. A number of alternative embodiments are disclosed for indicating the speed of the rotating workpiece including a novel digitizer which also provides a steady state signal indicative of workpiece rotational speed.

47 Claims, 7 Drawing Figures

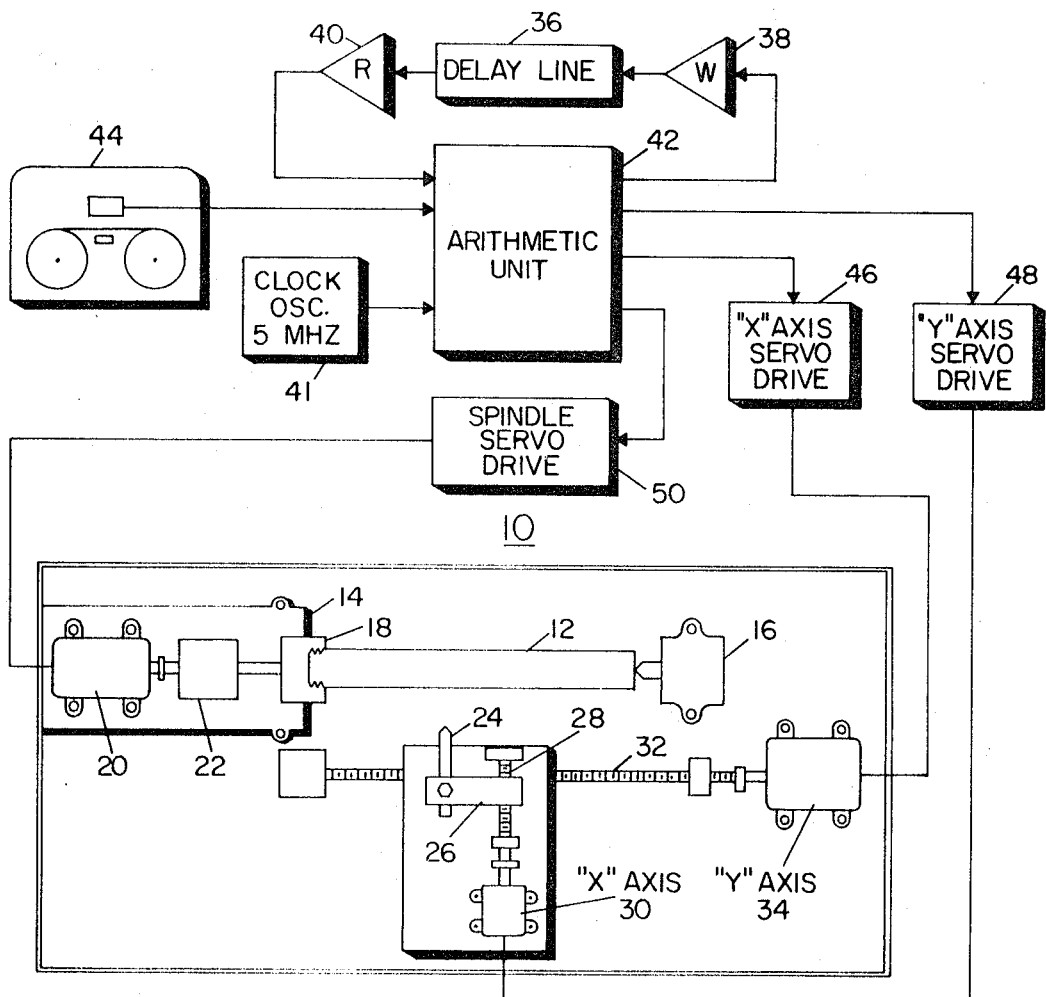
FIG. 1
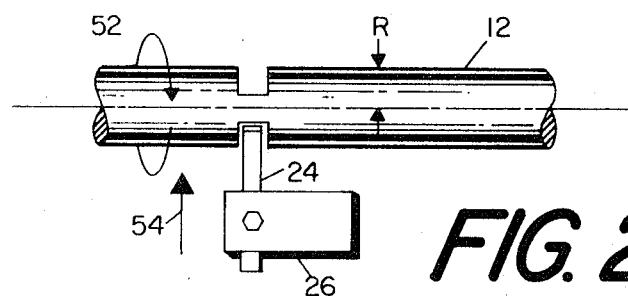
FIG. 3     FIG. 2
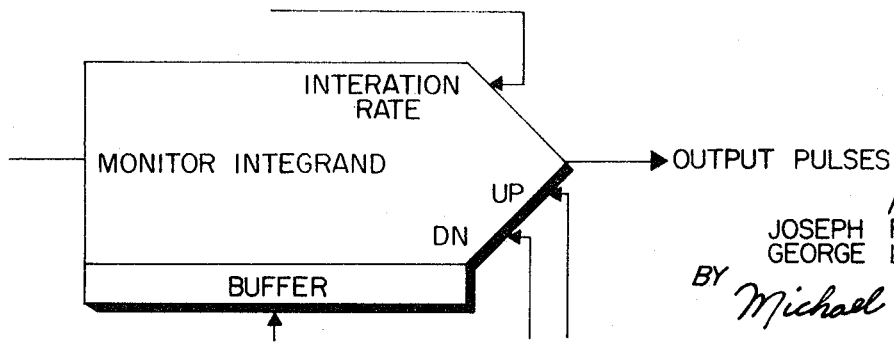
INVENTORS
JOSEPH F. BAKEL
GEORGE L. ROGERS
BY Michael Masnik
THEIR ATTORNEY Patented May 23, 1972

INVENTORS
JOSEPH F. BAKEL
GEORGE L. ROGERS
BY Michael Masnik
THEIR ATTORNEY

INVENTORS
JOSEPH F. BAKEL
GEORGE L. ROGERS
BY *Michael Masnik*
THEIR ATTORNEY

Patented May 23, 1972

INVENTORS
JOSEPH F. BAKEL
GEORGE L. ROGERS
BY Michael Masnik
THEIR ATTORNEY

NUMERICAL CONTROL SYSTEM FOR PROVIDING A CONSTANT RATE OF METAL REMOVAL

BACKGROUND OF THE INVENTION

The present invention relates to electronic control systems. More specifically, the invention relates to a novel numerical control system having the capability of controlling a machine tool so as to provide a constant surface feet per unit time metal removal rate.

Numerical control systems for machine tools are a relatively recent development in electronic technology. Initially, numerical control systems were extremely limited in their capabilities because they were primarily constructed of magnetic devices such as relays, transformers, etc., which limited the effective size and calculation speed of the control system. With the advent, however, of solid state electronic devices there has been substantial improvement in both the complexity and speed of numerical control systems. As a result of this advance in technology, the advances in the numerical control systems have included not only increased speed and accuracy but also the capability of performing and controlling an ever increasing number of functions.

One of the latest developments in numerical control systems is referred to broadly under the term "adaptive control." Under this phase of numerical control development, the operation of the controlled machine has been controlled by sensing various conditions during the actual metal cutting operation and modifying the operation of the control system accordingly. Thus, it is now known to sense torque, tool temperature, and other variables in the system and to modify the operation of the system accordingly.

In programming prior art numerical control systems, one of many factors to be taken into account, particularly for a controlled lathe, has been referred to as surface feet per minute metal removal rate. That is, the speed of the rotating workpiece has been synchronized with the rate at which the cutting tool advances so as to provide substantially a constant rate of metal removal when measured in terms of the surface feet per unit time. In order to maintain this characteristic, it has been necessary in prior art systems to continually change the information fed into the control system so as to reflect a change in the radius of the rotating workpiece as the cutting tool advances toward the center of the rotating workpiece. Generally, this is accomplished by driving the cutting tool toward the center of the workpiece at a constant rate and increasing the speed of the rotating workpiece as the effective radius of the workpiece decreases. In most machine tools, the speed is not increased on a continuous basis but rather the programmer changes the speed incrementally as the effective radius decreases so as to approximate a constant surface feet per unit time metal removal rate. It will be apparent from the foregoing, that the accuracy (and therefore the condition of the cut) varies widely depending upon the actual program used to control the speed of the rotating workpiece.

In the so-called adaptive control systems, the speed of the rotating workpiece and/or the speed of the cutting tool may be varied adaptively as a function of the actual cutting conditions. That is, when a programmer selects the optimum rate of machine tool performance, he ordinarily does so from standard factors relating to the particular type of tool used and the particular type of metal being operated on. These factors are, at best, approximations of the actual conditions in any given operation and are for the most part essentially conservative. An adaptive control system, on the other hand, takes into account the actual conditions extant at the time a particular operation takes place. As a result of sensing these actual conditions, the performance of the machine will be varied.

It will be appreciated from the foregoing that an adaptive control system poses particular problems as regards constant surface feet per minute metal removal. It is no longer feasible to simply program changes in the speed of the rotating workpiece so as to take into account the desired surface feet per minute removal rate since the speed of the spindle and/or the cutting tool may be varied as a result of the adaptive control function.

Finally, in a control system which has significant control over the continuous speed of the rotating workpiece, it may be necessary to provide a steady state indication of the actual speed of the rotating workpiece. This presents some problems in conventional systems since the speed of the rotating workpiece is generally represented by either an analog signal as from a conventional tachometer, or, alternatively, by way of a pulse frequency signal from a digital encoder. Therefore, it may be necessary in certain types of control systems to "digitize" the actual spindle speed so as to provide a steady state digital signal indicative of the actual speed of the rotating workpiece.

SUMMARY OF THE INVENTION

Accordingly, it is an object of the present invention to provide a novel numerical control system.

It is a further object of the present invention to provide a novel numerical control system having the capability of controlling the speed of a rotating workpiece on a continuous basis.

It is a still further object of the present invention to provide such a novel numerical control system which continuously maintains a desired surface feet per unit time rate of metal removal from a rotating workpiece.

It is a still further object of the present invention to provide a novel digitizer which provides a steady state digital signal indicative of a pulse frequency signal applied to its input.

It is a still further object of the present invention to provide such a novel digitizer which also provides an output frequency proportional to the input pulse frequency.

Briefly stated, the present invention accomplishes these and other objects by mechanizing the mathematical relationship between the effective radius of the rotating workpiece, the rate at which the workpiece is rotating, and the desired surface feet per unit time rate of metal removal. This is accomplished by generating a first digital signal which is proportional to the desired surface feet per unit time and equating that signal with a second digital signal proportional to the product of the effective radius of the rotating workpiece and the speed of the rotating workpiece. These two signals are compared and as a result of this comparison the speed of the rotating workpiece is varied so as to maintain the desired surface feet per unit of time of metal removal.

BRIEF DESCRIPTION OF THE DRAWINGS

While the specification concludes with claims particularly pointing out and distinctly claiming the subject matter which is regarded as the invention, an illustration of several particular embodiments can be seen by referring to the specification in connection with the accompanying drawings in which:

FIG. 1 is a block diagram of a typical numerical control system for controlling an illustrative machine tool;

FIG. 2 is an illustration of the operation of such a machine tool showing in detail the rotating workpiece and the cutting tool;

FIG. 3 is the operational symbol for an integrator as used in FIGS. 4–7;

DESCRIPTION OF THE PREFERRED EMBODIMENT

Figure 4:
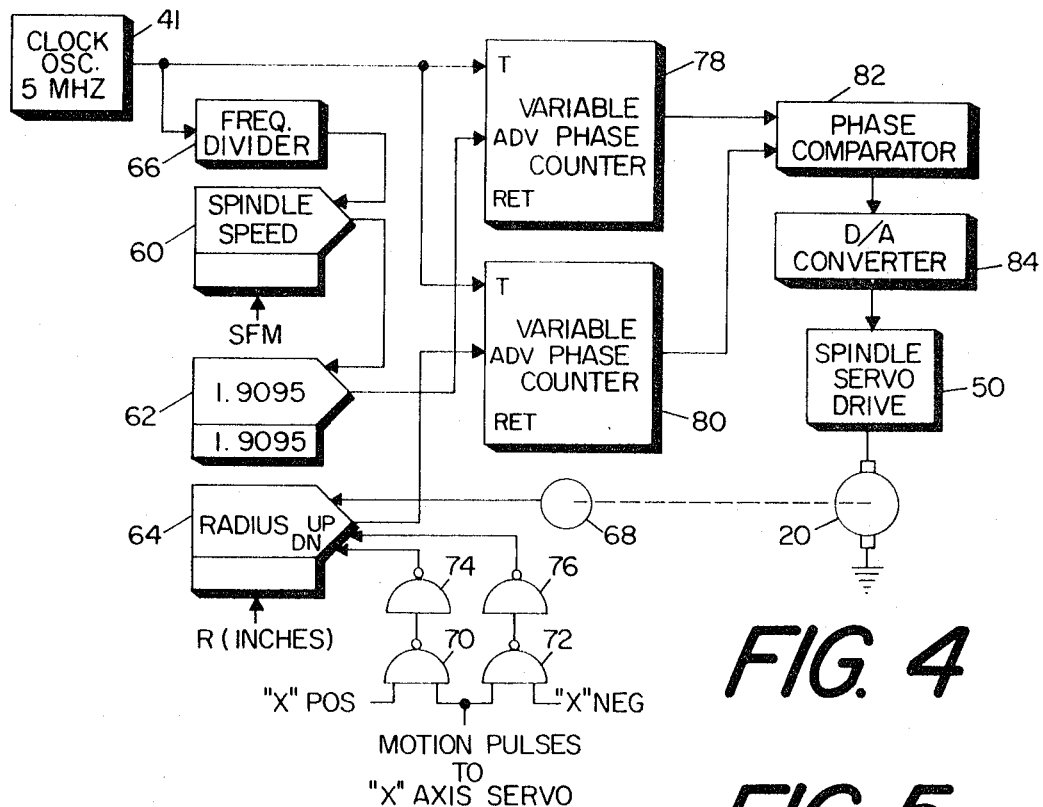
FIG. 4 is a block diagram illustrating an embodiment of the present invention.

Before turning specifically to the subject matter comprising the preferred embodiment of the present invention, it will be necessary briefly to describe a particular type of numerical control for machine tools. Turning then to FIG. 1, there is shown a conventional engine lathe 10 which includes a workpiece 12 mounted between a headstock 14 and a tailstock 16. The workpiece 12 is mounted in a chuck 18 which is rotated by spindle drive motor 20 so as to rotate the workpiece 12. The spindle drive motor 20 is connected to a gear box 22 so as to provide a plurality of gear ranges within which various cutting speeds can be achieved.

The workpiece 12 is operated on by a cutting tool 24. The cutting tool 24 is mounted in a tool post 26 which is in turn mounted on a lead screw 28. Lead screw 28 is driven by an "X" axis drive motor 30. As the "X" drive motor 30 rotates, the cutting tool 24 will be moved in the appropriate direction relative to the workpiece 12.

In order to move the cutting tool 24 parallel to the rotating axis of the workpiece 12, the cutting tool and its associated drive are mounted on a second lead screw 32. Lead screw 32 is coupled to the "Y" axis drive motor 34. In this fashion, rotation of the "Y" axis drive motor 34 results in moving the cutting tool 24 parallel to the rotating axis of the workpiece 12.

The machine tool described above will be recognized by those skilled in the art as a conventional engine lathe. As such, it is described herein only as representative of a variety of possible machine tool configurations which can utilize the present invention and is in no way to be construed as a limitation upon the present invention or its possible uses. Thus, the above description is exemplary only.

The remainder of FIG. 1 relates to a block diagram of a known type of numerical control system which is adapted to control the operation of the machine tool exemplified by the lathe 10. A control system of this type is described in detail in co-pending U.S. patent application Ser. No. 709,242, filed Feb. 29, 1968 by James P. Corbett et al. and assigned to the assignee of the present invention. The numerical control system disclosed in the above-cited U.S. patent application is to be considered only one way of carrying out the present invention since any type of numerical control system could be arranged so as to operate in accordance with the principles of this invention. Therefore, the present invention is not to be considered limited to a control system of that particular type.

Briefly, the control system described in the above-cited U.S. patent application includes a delay line 36 for storage of the operational data. The delay line 36 receives its data from a write amplifier 38 and feeds its output data through a read amplifier 40. The output of the read amplifier 40 forms one input to an arithmetic unit 42. After the necessary manipulations in the arithmetic unit 42, the data is returned to the delay line 36 by way of the write amplifier 38. Thus, the combination of delay line 36, amplifiers 38, 40, and arithmetic unit 42 forms a circulating data storage loop.

In such a numerical control system, data may be provided by some well known type of data input means such as a tape reader 44. The data for describing the desired operation of the machine tool 10 is coded into some type of tape such as punched or magnetic tape. The tape reader 44 is connected to an additional input to the arithmetic unit 42. It will be apparent that entering data from the tape reader 44 into the arithmetic unit 42 allows that data to be ultimately placed on the delay line 36 and, therefore, to be stored within the recirculating data storage loop.

The basic function of the arithmetic unit 42 is to carry out the various arithmetical computations that are required in a numerical control system of this type. After these computations take place, the data is generally returned to the delay line 36. However, it will also be apparent that certain control functions result from the computations in the arithmetic unit. In particular, the controlled axes of the machine tool 10 must be moved in accordance with the data provided from the data input means 44. Thus, the arithmetic unit 42 has a number of additional outputs which feed pulses or other signals to the appropriate devices for controlling the operation of the machine tool 10. Thus, for example, there is provided an "X" axis servo drive 46 and a "Y" axis servo drive 48 which receive instructions from the arithmetic unit 42 and control the rotation of the "X" axis drive motor 30 and the "Y" axis drive motor 34, respectively.

In addition to the drive for the controlled machine axes, it is also necessary to provide a spindle servo drive 50 which controls the speed and operation of the spindle drive motor 20.

Briefly, it can be seen that the numerical control system of FIG. 1 carries out certain arithmetic computations on the data received from the data input means 44. As a result of these computations, the various axes and functions of the controlled machine tool 10 take place under the fully automatic control of the numerical control system. Such numerical control systems are, of course, well known in the art and form no part of the present invention per se. Rather, the present invention deals with a particular aspect of an improved type of numerical control system as will be described in detail hereinafter.

As pointed out hereinbefore, a primary object of the present invention is to provide automatically for the control of a numerical controlled machine tool so as to provide a constant rate of metal removal in terms of constant surface feet per minute. FIG. 2 is a symbolic representation of the rotating workpiece 12, the cutting tool 24 and the tool post 26. This figure will be referred to briefly for the purposes of explaining the desired characteristics of constant surface feet per minute metal removal. During the operation of the machine tool 10 of FIG. 1, the workpiece 12 may be rotating, for example, in the direction illustrated by the arrow 52 in FIG. 2. Similarly, the tool post 26 and cutting tool 24 will be advancing toward the rotating workpiece 12 in the direction indicated by the arrow 54. If the speed of the rotating workpiece 12 is held constant as the cutting tool 24 moves into the workpiece 12 in the direction shown by arrow 54, it will be apparent that the surface rate of metal removed from the workpiece 12 will vary. This is due to the fact that as the cutting tool 54 removes metal from the workpiece 12, the effective radius of the workpiece 12 decreases.

That is, as the effective radius of the workpiece 12 decreases it will be apparent that the surface feet per minute of metal removed from the workpiece 12 goes through a corresponding decrease. Mathematically, the relationship between surface feet per minute and the rotational speed of the workpiece can be expressed as follows (assuming that the cutting tool 24 moves toward the center of the workpiece at a constant speed):

(1) Surface Feet Per Minute (SFM) = Circumference of Rotating Workpiece (in Feet) × Rotational Speed of Rotating Workpiece in (RPM).

If the effective radius $R$ of the workpiece 12 (i.e., at the cutting tool) is expressed in inches:

(2) or $$SFM = \frac{2\pi}{12} R \times RPM$$

(3) $\quad SFM = 0.52276\ R \times RPM$

Rearranging terms:

(4) $\quad RPM \times R = 1.9095 \times SFM.$

As was pointed out briefly hereinbefore, one of the primary objects of the present invention is to provide a novel numerical control system including a novel control system for providing constant surface feet per minute. The relationships expressed above will be heavily relied on in mechanizing this desired result.

Before turning to a detailed description of the several embodiments of the present invention, it is necessary to describe briefly the various logic elements used in the block diagrams of FIGS. 4–7.

One of the most commonly used elements in these figures is an integrator. Since the present invention is shown preferably in digital logic form, the various integrators in FIGS. 4–7 will ordinarily be digital integrators of any of several well known types. For this reason, the integrators in FIGS. 4–7 are shown by operational symbol only rather than by particular details of construction since the present invention is not in any way limited to the particular construction of the integrators used. FIG. 3 is a detailed illustration of the operational symbol for a digital integrator which will be referred to for an explanation of digital integrators in general.

In general, digital integrators utilize at least two digital registers, referred to as the integrand register and the remainder register. In order to perform the desired integration, the contents of the integrand register are repeatedly added to the contents of the remainder register at a rate referred to as the iteration rate. Each time the remainder register overflows its capacity, there is an output from the integrator, generally in the form of a digital pulse. The frequency at which these pulses are generated is the time integration of the number which is stored in the integrand register. As is well known, if the number stored in the integrand register is held constant, then the pulse output frequency will also be constant and will be a function of the iteration rate and the number stored in the integrand register. On the other hand, it is also known to vary the number in the integrand register so as to generate other than linear integrals.

The integrator symbol of FIG. 3 will be labeled throughout FIGS. 4–7 with an indication of the number which is stored in the integrand register. That is, for example, integrator 60 in FIG. 4 is labeled "Spindle Speed" so as to indicate that the number in the integrand register is a function of the desired spindle speed. Similarly, integrator 62 in FIG. 4 is labeled with the number "1.9095" to indicate that the number stored in the integrand register is held constant at that value.

The pulse frequency which serves as the iteration rate for the integrators is fed into the upper right-hand corner at the point labeled "Iteration Rate." A second input to the integrator of FIG. 3 is indicated by the arrow at the bottom of the integrator. This particular input is used for supplying the integrator with so-called "buffer" data. That is, as is well known in various types of control systems, the data input to the system provides not only for active data being presently utilized by the control system but also provides for buffer storage wherein future data is held until it is needed for the next sequence of operation. Therefore, the small rectangle on the bottom of the integrator symbol of FIG. 3 is used to denote the input and location of the buffer data for that particular function.

The lower right-hand corner of the integrator of FIG. 3 has two inputs labeled "UP" and "DN." These two inputs are used to vary the number stored in the integrand register. That is, a pulse on the "UP" input results in increasing the value of the number stored in the integrand register. Conversely, a pulse on the "DN" input results in decreasing the value of the number stored in the integrand register. Generally, pulses at these inputs result in varying the value of the number stored in the integrand register by one unit but it will be apparent that other variations are possible. In this way, the value of the integrand can be varied during operation so as to generate something other than a straight linear output function.

The integrator of FIG. 3 has an additional output at the left-hand side labeled "Monitor." This particular output is used to monitor the value of the number presently stored in the integrand register as will be necessary under various conditions of operation.

Finally, the output of the integrator of FIG. 3 emanates from the right-hand side and is, as described hereinbefore, a series of pulses indicative of the integration which has taken place within the integrator.

The logic symbol denoted by reference numeral 70 in FIG. 4 is a simple NAND gate. The NAND gate 70 operates in the following fashion. When both of its inputs are at logic 1, the output (indicated by the circle) will be a logic 0. Under all other conditions, the output of NAND gate 70 will be logic 1.

Finally, the logic symbol denoted with the number 74 in FIG. 2 is a simple inverter which operates to invert the sense of the logic signal applied at its input. That is, if the input is a logic 1 the output (indicated by the circle) will be a logic 0. Conversely, if the input is a logic 0 the output will be an logic 1.

Turning now to FIG. 4, there is shown a block diagram illustrating the detailed operation of a preferred embodiment of the present invention. Briefly stated, the embodiment of FIG. 4 mechanizes the relationships shown in equations (1)–(4) above.

Referring back to equation (4) above, it can be seen that integrating both sides with respect to time yields:

(5) $$\int^T RPM \times R = \int^T 1.9095 \times SFM$$

By separation of terms (6) $$\int^T RPM \times R = \int^T 1.9095 \times \int^T SFM$$

Since the RPM term on the left-hand side of equation (6) relates to the speed of the rotating workpiece, it can be appreciated that it may not be necessary to integrate this term since it is already a pulse frequency and can therefore be used as the iteration rate for integrating the radius term R.

Referring now to FIG. 4, it can be seen that the right-hand side of the equation (6) is mechanized by integrators 60, 62 whereas the left-hand side of equation (6) is mechanized by integrator 64. That is, the output of integrator 62 will be a pulse frequency proportional to the right-hand side of equation (6) whereas the pulse frequency output from integrator 64 will be proportional to the left-hand side of equation (6). In brief, it can be seen that the combination of integrators 60 and 62 act as a first pulse generating means to generate a digital signal proportional to the desired SFM rate. Similarly, integrator 64 acts as a second pulse generating means for generating a digital signal proportional to the product of the effective radius (R) of the rotating workpiece and the rotational speed (RPM) of the rotating workpiece.

This is accomplished in the following manner. The clock oscillator 41 of FIG. 1 feeds to a frequency divider 66 whose output frequency is selected so as to generate the desired iteration rate for integrator 60. The data input to integrator 60 comes from the data input means 44 of FIG. 1 and is the desired surface feet per minute (SFM) rate. Therefore, since the integrand of integrator 60 is the desired surface feet per minute, the output of integrator 60 is the time integral of the desired surface feet per minute as set forth in the right-hand side of equation (6). The output of the integrator 60 is used as the iteration rate for integrator 62. The integrand register for integrator 62 is the constant factor 1.9095. Therefore, it will be apparent that the output of integrator 62 is equal to the product of the two integrations set forth in the right-hand side of equation (6) above.

The input information for integrator 64 is nominally the effective radius of the workpiece 12. This information is initially supplied by the data input means 44 of FIG. 1. It should be pointed out that the radius information need not necessarily be a precise definition of the actual radius of the workpiece. Instead, as used herein, the term "effective radius" is defined as the distance (ordinarily in inches) from the center of the rotating workpiece to the present position of the tip of the cutting tool 24.

The iteration rate for the integrator 64 is supplied from a speed indicating means such as the digital encoder 68 which is mounted somewhere in the spindle drive train so as to generate a digital signal which is proportional to the rotational speed of the spindle drive motor 20 and therefore of the rotating workpiece 12. The pulse frequency output from the encoder 68 is then fed to the iteration rate input of integrator 64 so as to mechanize the left-hand side of equation (6).

Referring back to FIG. 2, it will be remembered that the effective radius (which is the integrand of integrator 64) varies as the cutting tool moves toward the center of the workpiece 12. This change in effective radius is taken into account by varying the integrand of integrator 64. This is accomplished by the NAND gates 70, 72 and inverters 74, 76. As was pointed out in the description of the general numerical control system of FIG. 1, the arithmetic unit 42 generates pulses to the "X" axis servo drive 46 and the "Y" axis servo drive 48. Conventionally, each of these pulses indicates that the particular axis in question is to move a desired amount, say 0.0001 inch. These pulses are referred to as "motion pulses." It will be apparent that with each "motion pulse" the position of the cutting tool 24 will change. If the cutting tool is being commanded to move toward the center of the rotating workpiece 12, it will also be apparent that the effective radius of the workpiece is decreasing and therefore that the integrand of integrator 64 must decrease. Conversely, if the cutting tool 24 is being commanded to move away from the center of the rotating workpiece 12 (as, for example, at the completion of a cut) the effective radius of the workpiece 12 is increasing which requires an increase in the number stored in the integrand register.

To accomplish these changes, the motion pulses to the "X" axis servo drive 46 are fed to gates 70 and 72. For the purposes of the present discussion, it will be assumed that these pulses go to logic 1 each time it is desired to move the "X" axis a certain predetermined amount.

The other input to gate 70 is the signal XPOS. This signal is generated elsewhere in the numerical control system and assumes the logic 1 state whenever the "X" axis is commanded to move in the positive direction. For the sake of convention, it will be assumed that the positive direction of the "X" axis is toward the center of the rotating workpiece. Similarly, the signal XNEG forms the second input to gate 72. This signal will go to a logic 1 whenever the "X" axis is being commanded to move in the negative direction (or away from the center of the rotating workpiece 12).

When the "X" axis is commanded to move in the positive direction it will be apparent that the cutting tool 24 is advanced toward the center of the workpiece thereby decreasing the effective radius of the workpiece 12. In order to compensate for this in the radius integrator 64, it will be necessary to decrease the integrand. This is accomplished by connecting the output of gate 70 to the DN input of the integrator 64 via inverter 74. Thus, when the "X" axis is being commanded to move in the positive direction the signal XPOS will be a logic 1. With each logic 1 pulse being fed to the "X" axis servo drive 46, the output of gate 70 will go to logic 0, causing the output of inverter 74 to go to logic 1. Since this output is connected to the DN input of integrator 64, the integrand register will be reduced a corresponding amount. Gate 72 and its associated inverter 76 act to increase the integrand when "X" axis is moving in the negative direction.

In order to fully mechanize the relationship of equation (6) above it will be necessary to see that the pulse frequencies from integrators 62 and 64 are maintained approximately the same so as to equalize the two sides of equation (6). Therefore, there must be provided comparison means for comparing the output of these two integrators. In the embodiment of FIG. 4, the output pulse frequencies of integrators 62 and 64 are compared by generating signals of varying phase and then comparing the phase of the signals. It should be pointed out, however, that the present invention is not limited to comparing these output signals on a phase basis but rather encompasses any of several well known techniques of comparing two pulse frequencies.

In order to accomplish the desired phase comparison there is provided first and second phase varying digital counters such as the variable phase counters 78, 80. Each of these variable phase counters are connected to the clock oscillator 41 via the trigger input terminal T so as to provide an input trigger signal which governs the basic frequencies of these variable counters. In addition to the trigger input terminal T, each of the variable phase counters 78, 80 has two auxiliary input terminals labeled "ADV" and "RET." These input terminals regulate the phase of the output signal from the variable phase counters. Pulses on the ADV input cause the phase to advance a predetermined amount whereas pulses on the RET input cause the phase to retard a predetermined amount. Variable phase counters of this general type are well known in the art as shown, for example, in U.S. Pat. No. 3,258,667.

The output of the integrator 62 is connected to the ADV input of the variable phase counter 78 and the output of integrator 64 is connected to the ADV input of the variable phase counter 80. Each time a pulse is generated by integrator 62, the phase of the output of variable counter 78 is advanced a predetermined amount. Similarly, each time a pulse is generated by integrator 64 the phase of the variable phase counter 80 is advanced a similar amount. Therefore, it can be seen that the phase of the signals generated by the variable phase counters 78 and 80 are proportional to the pulse frequency signals output from integrators 62 and 64, respectively. It will be apparent that the outputs of integrators 62, 64 could be connected to the RET inputs of counters 78, 80 with the same net result.

The phase varying output signals from variable phase counter 78, 80 are then fed to a phase comparator 82. The purpose of the phase comparator 82 is to assure that the variable phase signals from counter 78, 80 remain approximately equal. If these two signals are unequal, there will be an output from the phase comparator 82 which will then be used to either increase or decrease the spindle speed so as to equalize these signals. For this reason, the output of the phase comparator 82 is connected to the input of a D/A converter 84. The output of D/A converter 84 will be an analog voltage signal proportional to the output of the phase comparator 82. This signal is relayed to the spindle servo drive 50 of FIG. 1 which, in turn, controls the speed of the spindle drive motor 20. Since the encoder 68 is mechanically coupled to the spindle drive motor 20, it can be seen that the loop is now closed and the relationship in equation (6) is fully mechanized.

It will be apparent to those skilled in the art that the variable phase signals from counters 78, 80 will not be precisely in phase since some phase error will be required to supply power to the spindle drive motor 20. However, for a constant spindle speed there will be a constant phase difference so that the frequency of the signals from integrators 60, 62 is equalized.

By way of brief explanation, consider the operation of the embodiment of FIG. 4 as the cutting tool 24 is moved toward the center of the rotating workpiece 12. Since the integrands of integrators 60 and 62 remain constant for a desired surface feet per minute characteristic, it will be apparent that the output signal from integrator 62 is a pulse signal having a constant frequency. Similarly, the output of integrator 64 will have a frequency which is proportional to the speed of the rotating spindle and the initial effective radius of the workpiece 12. Assuming that the initial spindle speed and the initial radius are properly selected, it will be seen that the frequency of the pulse signal from integrator 64 will be equal to the frequency of the pulse signal from the integrator 62. In the alternative, it may be desirable to program the numerical control system in such a way as to initially establish the spindle speed by programming the desired surface feet per minute and the effective radius of the workpiece 12. After a predetermined time delay, the control system of FIG. 4 will have established the spindle speed at the desired rate.

As soon as the cutting tool 24 begins to move toward the center of the rotating workpiece 12, it will be apparent that the integrand of the radius integrator 64 decreases. If the frequency of the output from encoder 68 (which establishes the iteration rate of integrator 64) remains the same, it will also be apparent that the output frequency from the integrator 64 will accordingly decrease since its output frequency is a function of its iteration rate and the value of the number stored in its in its integrand register. When this happens, there will be a phase difference between the output of the variable phase counters 78, 80 since the rate at which the phase of the output of counter 80 is advancing will be correspondingly decreased. This phase difference will cause a signal to be generated by phase comparator 82 which is relayed via D/A converter 84 and the spindle servo drive 50 so as to cause the speed of the spindle drive motor 20 to increase. Thus, it can be seen that the embodiment of FIG. 4 operates to continually increase the speed of the spindle drive motor (and therefore the the rotational speed of the workpiece 12) as the effective radius of the workpiece 12 decreases. In this way, the surface feet per minute is held constant.

After a cut has been made in the workpiece 12, the cutting tool 24 will be withdrawn from contact with the workpiece by programming the "X" axis to move away in the negative direction. When this happens, the effective radius of the workpiece 12 increases. In order to maintain the surface feet per minute characteristics, it will then be necessary to increase the number in the radius integrator 64. This is accomplished by virtue of the fact that NAND gate 72 is connected to the UP input of the integrator 64 so as to increase the value of the number stored in the integrand as the cutting tool moves away from the workpiece 12. Therefore, it can also be seen that the embodiment of FIG. 4 allows the programmer to establish initial values of surface feet per minute and effective radius. Thereafter he need only program the various motions of the cutting tool and the system of FIG. 4 will assure that the desired surface feet per minute characteristic is maintained for all cuts. If it becomes desirable to change the surface feet per minute, this can be done by simply programming a different value of surface feet per minute without having to affect the value of the radius. As described hereinbefore, the spindle speed will be automatically adjusted to provide the new surface feet per minute characteristics.

Figure 5:
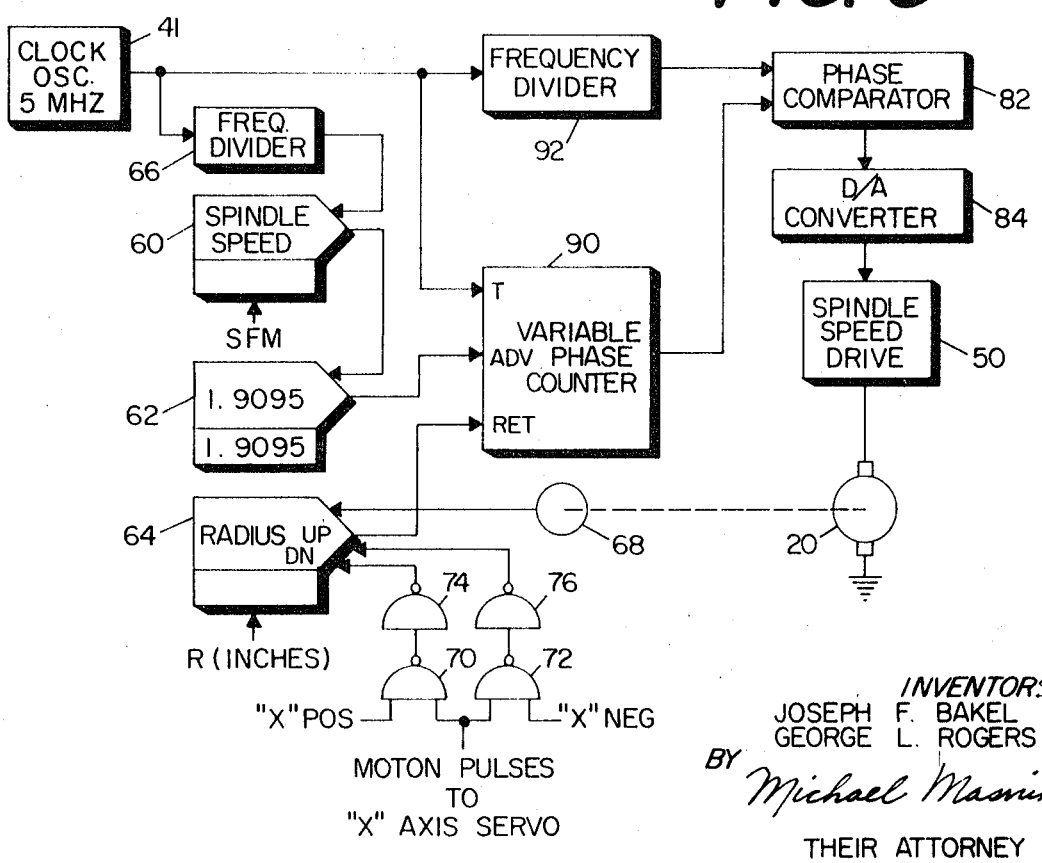
FIG. 5 is a block diagram of a further embodiment of the present invention.

Turning now to FIG. 5, there is shown an alternative embodiment of the control system disclosed in FIG. 4. In essence, the embodiment of FIG. 5 is identical to that of FIG. 4 with the exception that the means for comparing the outputs of the integrators 62, 64 is changed. Therefore, to the extent that the system of FIG. 5 is similar to the system of FIG. 4, it will be unnecessary to re-describe the operation. In addition, elements which are common to both FIGS. 4 and 5 bear the same reference numerals.

Briefly, it will be recalled from the description of FIG. 4 that the integrators 62 and 64 will each generate a series of pulses, the frequency of which should be approximately equal. In the system of FIG. 4, a pair of variable phase counters 78, 80 was used to generate phase varying signals that were ultimately compared by the phase comparator 82.

In the system of FIG. 5, there is provided a single variable phase counter 90. As in the case of the variable phase counters of FIG. 4, the output of the clock oscillator 41 is fed to the trigger input terminal T of the variable phase counter 90. However, the variable phase counter 90 has the output of both integrators 62, 64 fed to its other inputs. The output of the integrator 62 is fed to the ADV input so as to cause the phase of the variable phase counter 90 to advance a predetermined amount each time a pulse is generated by integrator 62. Conversely, the output of the integrator 64 is fed to the RET input of the variable phase counter 90 so as to cause the variable phase counter 90 to retard a predetermined amount for each pulse from the integrator 64. It will be appreciated from a brief analysis of this circuit that the phase of the variable phase counter 90 will be neither advanced nor retarded if the pulse frequency from the two integrators 62, 64 is the same since the effect of one will be cancelled by the effect of the other.

In addition to the variable phase counter 90, there is also provided a frequency divider 92. The frequency divider 92 has its input connected to the clock oscillator 41. The division factor of the frequency divider 92 is the same as the division factor of the variable phase counter 90. That is, the basic frequency of the output signal from the frequency divider 92 is the same as the basic frequency of the output of counter 90. Therefore, it can be appreciated that if the variable phase counter 90 is neither advanced nor retarded in phase, The outputs of the variable phase counter 90 and the frequency divider 92 will be the same and will be in phase.

However, if the pulse frequency outputs from the integrators 62, 64 are different, there will be a net difference and therefore the variable phase counter 90 will be either advanced or retarded depending upon which of the two frequencies is higher.

By way of illustration, suppose that the pulse frequency output from the integrator 62 is higher than the pulse frequency output from the integrator 64. Under these circumstances it will be appreciated that it is necessary to increase the speed of the spindle drive motor 20 thereby increasing the speed of the rotating workpiece 12 so as to achieve the desired surface feet per minute characteristic. Under these circumstances, the phase of the variable phase counter 90 will be advancing since the pulse frequency on the ADV input is higher than the pulse frequency on the RET input. This difference in phase is detected by the phase comparator 82, relayed to the D/A converter 84, and ultimately to the spindle servo drive 50 so as to increase the speed of the spindle drive motor 20 and thereby the rotational speed of the workpiece 12. In this way, the desired surface feet per minute characteristic is re-established.

Figure 6:
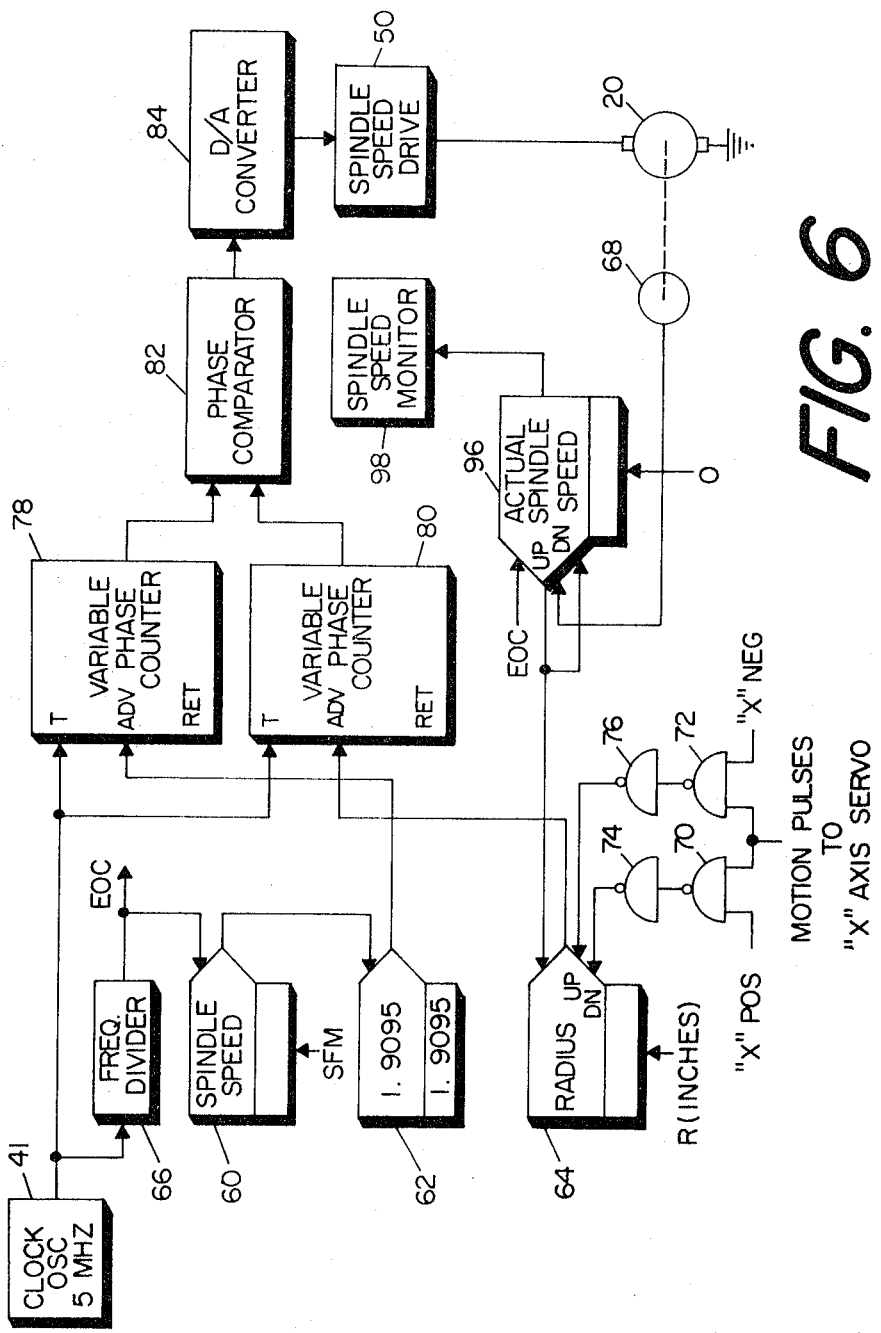
FIG. 6 is a block diagram of a still further embodiment of the present invention.

Turning now to FIG. 6, there is shown a still further embodiment of the control system comprising the present invention. The embodiment of FIG. 6 is the same as the embodiment of FIG. 4 with the exception of an additional integrator 96 which acts as the speed indicating means for generating a digital signal proportional to the rotational speed of the workpiece 12.

The integrator 96 will initially begin with a zero stored in its integrand register. The signal EOC is used for the iteration frequency and is derived from the output of the frequency divider 66. In a recirculating storage system of the type described hereinbefore, the signal EOC indicates the end of a complete circulation of data through the system. Thus, this signal indicates that the data has completely circulated through the system once and is therefore the maximum iteration rate in that particular type of control system. It should be pointed out, however, that the iteration rate of the integrator 96 is not critical. However, for maximum accuracy the iteration rate of the integrator 96 should be set as high as possible.

The output of the encoder 68 is connected to the UP input of integrator 96 so as to increase the number stored in the integrand register by one each time there is a pulse generated by the encoder 68. Conversely, the output of integrator 96 is connected to its own DN input. A brief analysis of these connections will show that the integrand of the integrator 96 will be increased with each pulse from the encoder 68 and correspondingly decreased by each pulse out of the integrator 96. If the spindle drive motor 20 (and therefore the workpiece 12) is rotating at a constant speed it will be apparent that the number stored in the integrand of integrator 96 will soon stabilized at a value necessary to equalize the pulse frequency outputs from the integrator 96 and the encoder 68. In this way, the output of the integrator 96 is exactly the same as the output of the encoder 68 so that this output can be used as the iteration rate for the integrator 64.

In addition, however, utilizing integrator 96 as the means for indicating the rotational speed of the workpiece provides an additional advantage in that the number stored in the integrand register is indicative of the actual spindle speed. As will be appreciated by those skilled in the art, there is often a need to provide a steady state digital number indicative of the spindle speed. For this reason, there is shown in FIG. 6 a spindle speed monitor 98 connected to the monitor input of the integrator 96. The spindle speed monitor 98 may comprise, for example, a comparator of some type which analyzes the actual speed of the rotating spindle so as to recognize the need for the spindle drive system to change gears, etc.

Thus, it can be seen that the embodiment of FIG. 6 provides not only a pulse frequency which is indicative of the speed of the rotating workpiece but also provides a steady state digital number stored in the integrand of integrator 96 which is similarly indicative of the actual spindle speed. Thus, the integrator 96 acts as a digitizer which can be used in a variety of applications to provide an accurate digital indication of the frequency of a pulse frequency signal.

It will be apparent that the embodiment of FIG. 6 can be further modified to include the means for comparing the output of integrators 62, 64 as disclosed in the embodiment of FIG. 5.

Figure 7:
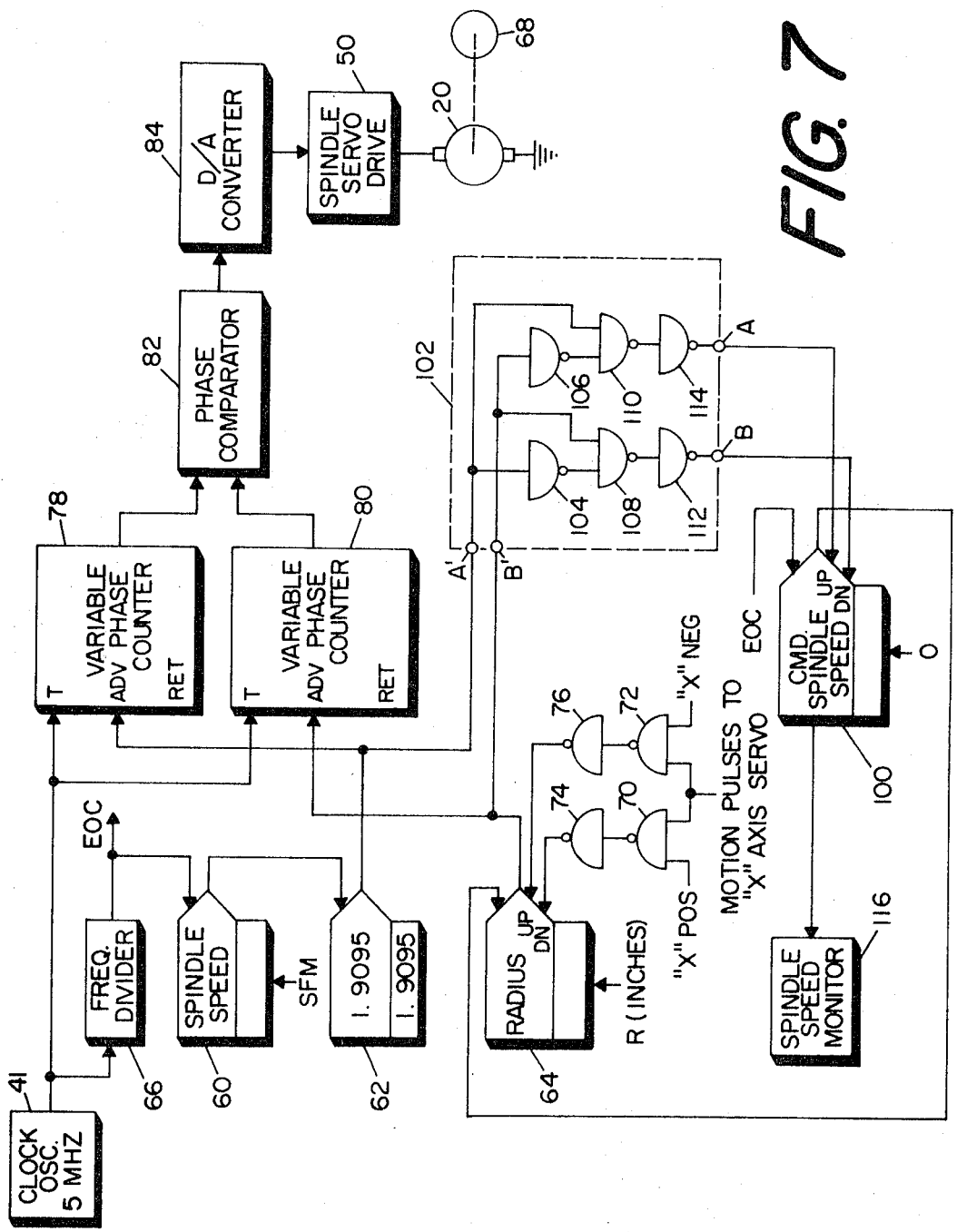
FIG. 7 is a block diagram of a still further embodiment of the present invention.

Turning now to FIG. 7, there is shown a still further embodiment of the present invention which is in many respects identical to that shown in FIG. 4. To the extent that the system of FIG. 7 is identical with that of FIG. 4, common reference numerals have been used and a detailed explanation will not be given.

The primary difference between the system of FIG. 7 and that of the preceding figures is that the pulse frequency signal for iterating the radius integrator 64 is not generated by the encoder 68 attached to the spindle drive motor 20. The system of FIG. 7 is particularly adapted to those types of controlled machine tools whose spindle drive has an excessively long time constant. That is, in certain types of machine tools the amount of time between a command to the spindle drive to change speed and the actual change in the speed of the spindle may be so long as to cause significant instability in the control loop of the systems of FIGS. 4–6. For this reason, the embodiment of FIG. 7 generates a digital signal indicative of the commanded speed of the spindle rather than relying on the output of the encoder 68 to indicate the actual speed of the spindle. In this way, the loop is closed but it is closed digitally through an additional integrator 100.

Integrator 100 is iterated at a relatively high frequency rate such as by the signal EOC generated by the frequency divider 66. The integrand register of the integrator 100 is initially established at zero. The UP input of the integrator 100 is connected by way of an exclusive OR circuit 102 to the output of integrator 62. Similarly, the DN input of the integrator 100 is connected to the output of integrator 64 via the exclusive OR circuit 102. The exclusive OR circuit 102 includes a pair of input inverters 104, 106, a pair of gates 108, 110, and a pair of output inverters 112, 114. An exclusive OR circuit of this type is well known in the art and requires no additional explanation except to point out that the signal on output terminal A will be a logic 1 if the logic signal on input terminal $A^1$ is a logic 1 and the logic signal on input terminal $B^1$ is a logic 0. Conversely, the signal on output terminal B will be a logic 1 if and only if the signal on output terminal $B^1$ is a logic 1 and the signal on input terminal $A^1$ is a logic 0.

As will be apparent to those skilled in the art, the purpose of exclusive OR circuit 102 is to prevent pulses from arriving simultaneously at both the UP input and the DN input of integrator 100.

In operation, the integrand of integrator 100 will be increased each time there is an output pulse from the integrator 62 (unless this pulse is blocked by the exclusive OR circuit 102 due to a simultaneous pulse out of integrator 64). Conversely, the integrand of integrator 100 will be decreased each time there is an output from integrator 64 (with the same proviso as above).

Assume that the integrand of the integrator 100 is initially at zero and assume that a desired surface feet per minute has been programmed into the spindle speed integrator 60. Under these circumstances, integrator 62 will begin to generate pulses at a frequency proportional to the desired surface feet per minute characteristic. With each such pulse, the variable phase counter 78 will advance in phase, the phase difference will be detected by phase comparator 82 and the speed of the spindle drive motor 20 will begin to increase. At the same time, the pulses from integrator 62 will be fed to the UP input of integrator 100 so as to begin to increase the number in the integrand register to reflect the increase in the spindle speed. As the spindle speed increases, however, the integrator 100 will begin to generate pulses as a result of increasing the number in its integrand register. These pulses will iterate the radius integrator 64 which will then begin to generate pulses to advance the phase of the variable phase counter 80. Operation thus continues in this fashion until such time as the number stored in the integrand of the integrator 100 is proportional to the commanded speed of the spindle. At this point, the outputs of the variable phase counters 78, 80 will be in phase with the understanding that the integrand of the radius integrator 64 will be continually changing if the "X" axis is moving. Changes in the integrand of integrator 64 will continually change the commanded spindle speed in accordance with the change in the effective radius of the workpiece 12. In this way, the spindle loop is effectively closed digitally so as to overcome the deleterious effects of an excessively long time constant without sacrificing the capability to maintain a constant surface feet per minute characteristic.

An additional advantage of the circuit of FIG. 7 is that integrator 100 has a number stored in its integrand which is proportional to the speed of the spindle. As in the embodiment of FIG. 6, therefore, this number can be fed to a spindle speed monitor circuit 116 so as to provide a digital number indicative of the present speed of the spindle for use in changing gears, etc.

Finally, it will be apparent to those skilled in the art that the means for comparing the outputs of the integrators 62, 64 as disclosed in the embodiment of FIG. 5 could also be used in the embodiment of FIG. 7.

Although the present invention has been described with respect to several particular embodiments, the principles underlining this invention will suggest many additional modifications of these particular embodiments to those skilled in the art. Therefore, it is intended that the appended claims shall not be limited to the specific embodiments shown, but rather shall cover all such modifications as fall within the true spirit and scope of the present invention.

What is claimed as new and desired to be secured by Letters Patent of the United States is:

1. A digital control system for a numerically controlled machine tool for maintaining a constant surface feet per unit time rate of metal removal from a rotating workpiece by a moving cutting tool comprising:
    a. a master clock oscillator for synchronizing the operation of the system;
    b. data input means for indicating the effective radius of said rotating workpiece and the desired surface feet per unit time rate;
    c. a first pulse generating means operatively connected to said data input means for generating a first digital signal proportional to the desired surface feet per unit time rate;
    d. first drive means for controllably moving the cutting tool relative to the rotational axis of said rotating workpiece;
    e. second drive means for controllably rotating said rotating workpiece;
    f. speed indicating means for generating a digital signal proportional to the rotational speed of said rotating workpiece;
    g. a second pulse generating means operatively connected to said data input means and to said speed indicating means for generating a second digital signal proportional to the product of the effective radius of said rotating workpiece and the rotational speed of said rotating workpiece; and
    h. comparison means operatively connected to said first and second pulse generating means for comparing said first and second digital signals, the output of said comparison means being operatively connected to said second drive means so as to control the speed of said rotating workpiece.

2. The digital control system recited in claim 1 wherein said data input means also indicates the desired rate and direction of motion of said cutting tool and further comprising motion command means operatively connected to said data input means for generating a digital signal proportional to said desired rate and direction of cutting tool motion, the output of said motion command means being operatively connected to said first drive means to control the operation thereof.

3. The digital control system recited in claim 2 wherein the output of said motion command means is operatively connected to said second pulse generating means so as to continuously vary the effective radius of said workpiece in response to the commanded motion of said cutting tool.

4. The digital control system recited in claim 1 wherein said speed indicating means is operatively connected to said rotating workpiece so as to indicate the actual speed of said rotating workpiece.

5. The digital control system recited in claim 3 wherein said speed indicating means is operatively connected to said rotating workpiece so as to indicate the actual speed of said rotating workpiece.

6. The digital control system recited in claim 4 wherein said speed indicating means comprises a digital encoder operatively connected to said rotating workpiece.

7. The digital control system recited in claim 5 wherein said speed indicating means comprises a digital encoder operatively connected to said rotating workpiece.

8. The digital control system recited in claim 1 wherein said comparison means includes first and second phase varying digital counters operatively connected to said first and second pulse generating means, respectively, and to said master clock oscillator, said first and second phase varying digital counters being operative to change phase a predetermined amount in response to pulses from said first and second pulse generating means.

9. The digital control system recited in claim 3 wherein said comparison means includes first and second phase varying digital counters operatively connected to said first and second pulse generating means, respectively, and to said master clock oscillator, said first and second phase varying digital counters being operative to change phase a predetermined amount in response to pulses from said first and second pulse generating means.

10. The digital control system recited in claim 8 wherein said comparison means further comprises phase comparing means operatively connected to said first and second phase varying digital counters and being operative to generate an output signal proportional to the phase difference between said outputs of said first and second phase varying counters.

11. The digital control system recited in claim 9 wherein said comparison means further comprises phase comparing means operatively connected to said first and second phase varying digital counters and being operative to generate an output signal proportional to the phase difference between said outputs of said first and second phase varying counters.

12. The digital control system recited in claim 10 further comprising a digital-to-analog converter operatively connected to said phase comparing means for generating an analog voltage output signal proportional to the output of said phase comparing means and a drive motor operatively connected to the output of said digital-to-analog converter.

13. The digital control system recited in claim 11 further comprising a digital-to-analog converter operatively connected to said phase comparing means for generating an analog voltage output signal proportional to the output of said phase comparing means and a drive motor operatively connected to the output of said digital-to-analog converter.

14. The digital control system recited in claim 1 wherein said comparison means includes first and second phase varying digital counters operatively connected to said first and second pulse generating means, respectively, and to said master clock oscillator, said first and second phase varying means being operative to advance in phase a predetermined amount in response to pulses from said first and second pulse generating means.

15. The digital control system recited in claim 3 wherein said comparison means includes first and second phase varying digital counters operatively connected to said first and second pulse generating means, respectively, and to said master clock oscillator, said first and second phase varying means being operative to advance in phase a predetermined amount in response to pulses from said first and second pulse generating means.

16. The digital control system recited in claim 1 wherein said comparison means includes a phase varying digital counter operatively connected to said first and second pulse generating means and to said master clock oscillator and being operative to change phase in one direction in response to pulses from said first pulse generating means and to change phase in the opposite direction in response to pulses from said second phase varying means.

17. The digital control system recited in claim 3 wherein said comparison means includes a phase varying digital counter operatively connected to said first and second pulse generating means and to said master clock oscillator and being operative to change phase in one direction in response to pulses from said first pulse generating means and to change phase in the opposite direction in response to pulses from said second phase varying means.

18. The digital control system recited in claim 1 wherein said first pulse generating means includes a first digital integrator including an integrand register, said first digital integrator being operatively connected to said data input means whereby said data indicative of the desired surface feet per unit time rate is stored in said integrand register.

19. The digital control system recited in claim 3 wherein said first pulse generating means includes a first digital integrator including an integrand register, said first digital integrator being operatively connected to said data input means whereby said data indicative of the desired surface feet per unit time rate is stored in said integrand register.

20. The digital control system recited in claim 18 further comprising a second integrator having a predetermined constant number stored in the integrand register and being operatively connected to the pulse frequency output of said first integrator whereby the output of said first integrator acts as the iteration rate for said second integrator.

21. The digital control system recited in claim 19 further comprising a second integrator having a predetermined constant number stored in the integrand register and being operatively connected to the pulse frequency output of said first integrator whereby the output of said first integrator acts as the iteration rate for said second integrator.

22. The digital control system recited in claim 1 wherein said second pulse generating means comprises a third digital integrator having the effective radius of said rotating workpiece stored in the integrand register thereof and having the output of said speed indicating means as the iteration rate for said third digital integrator.

23. The digital control system recited in claim 3 wherein said second pulse generating means comprises a third digital integrator having the effective radius of said rotating workpiece stored in the integrand register thereof and having the output of said speed indicating means as the iteration rate for said third digital integrator.

24. The digital control system recited in claim 23 wherein the output of said motion command means is operatively connected to said integrand register of said third integrator so as to increase the value of the number stored in said integrator when the output of said motion command means calls for cutting tool motion in one direction and to decrease the value of the number stored in said integrand register when the output of said motion command means calls for cutting tool motion in the opposite direction.

25. The digital control system recited in claim 1 wherein said speed indicating means comprises a digital encoder operatively connected to said rotating workpiece and a fourth digital integrator operatively connected to said digital encoder whereby the output of said digital encoder acts to increase the value of the number stored in the integrand register of said fourth integrator, the pulse frequency output of said fourth digital integrator being connected to said fourth digital integrator so as to decrease the value of the number stored in said integrand register.

26. The digital control system recited in claim 3 wherein said speed indicating means comprises a digital encoder operatively connected to said rotating workpiece and a fourth digital integrator operatively connected to said digital encoder whereby the output of said digital encoder acts to increase the value of the number stored in the integrand register of said fourth integrator, the pulse frequency output of said fourth digital integrator being connected to said fourth digital integrator so as to decrease the value of the number stored in said integrand register.

27. The digital control system recited in claim 25 wherein said fourth digital integrator is operatively connected to said master clock oscillator, the output of said master clock oscillator acting as the iteration rate of said fourth digital integrator.

28. The digital control system recited in claim 26 wherein said fourth digital integrator is operatively connected to said master clock oscillator, the output of said master clock oscillator acting as the iteration rate of said fourth digital integrator.

29. The digital control system recited in claim 1 wherein said speed indicating means comprises a fifth digital integrator operatively connected to said first and second pulse generating means whereby pulses from said first pulse generating means act to vary the value of the number stored in the integrand register of said fifth digital integrator in one direction and pulses from said second pulse generating means act to vary the value of the number stored in the integrand register of said fifth digital integrator in the other direction.

30. The digital control system recited in claim 3 wherein said speed indicating means comprises a fifth digital integrator operatively connected to said first and second pulse generating means whereby pulses from said first pulse generating means act to vary the value of the number stored in the integrand register of said fifth digital integrator in one direction and pulses from said second pulse generating means act to vary the value of the number stored in the integrand register of said fifth digital integrator in the other direction.

31. The digital control system recited in claim 29 further comprising gate means for operatively connecting said outputs of said first and second pulse generating means to said fifth digital integrator.

32. The digital control system recited in claim 30 further comprising gate means for operatively connecting said outputs of said first and second pulse generating means to said fifth digital integrator.

33. The digital control system recited in claim 31 wherein said gate means comprises an exclusive OR gate so as to prevent pulses from both of said first and said second pulse generating means from arriving simultaneously at said fifth digital integrator.

34. The digital control system recited in claim 32 wherein said gate means comprises an exclusive OR gate so as to prevent pulses from both of said first and said second pulse generating means from arriving simultaneously at said fifth digital integrator.

35. A method of controlling a machine tool which is operable to remove metal from a rotating workpiece by a movable cutting tool comprising the steps of:
   a. generating a first digital signal proportional to a predetermined desired rate of metal removal in terms of surface feet per unit time;
   b. generating a second digital signal indicative of the effective radius of said rotating workpiece;
   c. generating a first pulse frequency signal proportional to said first digital signal;
   d. generating a second pulse frequency signal proportional to the speed of said rotating workpiece;
   e. generating a third pulse frequency signal proportional to the product of said second digital signal and said second pulse frequency signal;
   f. comparing said first and third pulse frequency signals so as to generate an output signal proportional to the pulse frequency difference therebetween; and
   g. controlling the speed of said rotating workpiece in response to the output signal generated during said step of comparing.

36. The method recited in claim 35 comprising the additional steps of:
   h. moving the cutting tool relative to the rotational axis of said rotating workpiece;
   i. generating a third digital signal indicative of the amount and direction of movement of said cutting tool; and
   j. varying the second digital signal in response to said third digital signal so as to continuously modify the effective radius of said rotating workpiece.

37. The method recited in claim 35 wherein step (f) includes the steps of:
   1. generating a first phase varying signal whose phase is proportional to the frequency of said first pulse frequency signal;
   2. generating a second phase varying signal whose phase is proportional to the frequency of said third pulse frequency signal;
   3. comparing the phase of said first and second phase varying signals.

38. The method recited in claim 36 wherein step (f) includes the steps of:
   1. generating a phase varying signal which varies in phase in one direction at a rate proportional to the frequency of said first pulse frequency signal and which varies in phase in one direction at a rate proportional to the frequency of said third pulse frequency signal;
   2. generating a first constant frequency signal whose frequency is the same as the basic frequency of said phase varying signal;
   3. comparing the phase of said phase varying signal with the phase of said first constant frequency signal.

39. The method recited in claim 36 wherein step (c) comprises the steps of:
   1. storing said first digital signal in the integrand register of a first digital integrator; and
   2. iterating said digital integrator at a constant frequency rate whereby the output of said first digital integrator constitutes said first pulse frequency signal.

40. The method recited in claim 36 wherein step (e) comprises the steps of:
   1. storing said second digital signal in the integrand register of a second digital integrator; and
   2. iterating said second pulse frequency signal whereby the frequency of said second pulse frequency signal whereby the output of said second digital integrator constitutes said third pulse frequency signal.

41. The method recited in claim 36 wherein step (c) comprises the steps of:
   1. storing said first digital signal in the integrand register of a first digital integrator; and
   2. iterating said second digital integrator at a constant frequency rate whereby the output of said first digital integrator constitutes said first pulse frequency signal; and
step (e) comprises the steps of:
   1. storing said second digital signal in the integrand register of a second digital integrator; and
   2. iterating said second digital integrator at a rate determined by the frequency of said second pulse frequency signal whereby the output of said second digital integrator constitutes said third pulse frequency signal.

42. The method recited in claim 36 wherein step (c) comprises the steps of:
   1. storing said first digital signal in the integrand register of a first digital integrator;
   2. iterating said first digital integrator at a constant frequency rate;
   3. storing a fixed number in the integrand register of a third digital integrator; and
   4. iterating said third digital integrator at a rate determined by the output of said first digital integrator whereby the output of said third digital integrator constitutes said first pulse frequency signal.

43. The method recited in claim 36 wherein step (d) comprises the step of rotating a digital encoder at a rate proportional to the speed of said rotating workpiece so as to generate a pulse frequency digital signal whereby the output of said digital encoder constitutes said second pulse frequency signal.

44. The method recited in claim 36 wherein step (d) comprises the steps of:
1. rotating a digital encoder at a rate proportional to the speed of said rotating workpiece so as to generate a pulse frequency output signal;
2. feeding the pulse frequency output signal from said digital encoder to a digital integrator so as to vary the number stored in the integrand register in one direction; and
3. feeding the pulse frequency output signal from said digital integrator to said digital integrator so as to vary the number stored in said integrand register in the opposite direction whereby the pulse frequency output from said digital integrator constitutes said second pulse frequency signal.

45. The method recited in claim 36 wherein step (d) comprises the steps of:
1. rotating a digital encoder at a rate proportional to the speed of said rotating workpiece so as to generate a pulse frequency digital signal;
2. feeding the pulse frequency signal from said digital encoder to a digital integrator so as to increase the number stored in the integrand register thereof; and
3. feeding the pulse frequency output signal from said digital integrator to said digital integrator so as to decrease the number stored in said integrand register whereby the pulse frequency output from said digital integrator constitutes said second pulse frequency signal.

46. The method recited in claim 36 wherein step (d) includes the steps of:
1. feeding said first pulse frequency signal to a digital integrator so as to vary the number stored in the integrand register of said digital integrator in one direction;
2. feeding said third pulse frequency signal to said digital integrator so as to vary the number stored in said integrand register in the other direction; and
3. iterating said digital integrator at a predetermined rate whereby the pulse frequency output from said digital integrator constitutes said second pulse frequency signal.

47. The method recited in claim 36 wherein step (d) includes the steps of:
1. feeding said first pulse frequency signal to a digital integrator so as to increase the number stored in the integrand register of said digital integrator;
2. feeding said third pulse frequency signal to said digital integrator so as to decrease the number stored in said integrand register; and
3. iterating said digital integrator at a predetermined rate whereby the pulse frequency output from said digital integrator constitutes said second pulse frequency signal.

* * * * *